(12) United States Patent
Kalyanavarathan et al.

(10) Patent No.: US 7,185,096 B2
(45) Date of Patent: Feb. 27, 2007

(54) SYSTEM AND METHOD FOR CLUSTER-SENSITIVE STICKY LOAD BALANCING

(75) Inventors: Vasanth Kalyanavarathan, Bangalore (IN); Sivasankaran R, Tamilnadu (IN)

(73) Assignee: Sun Microsystems, Inc., Santa Clara, CA (US)

( * ) Notice: Subject to any disclaimer, the term of this patent is extended or adjusted under 35 U.S.C. 154(b) by 654 days.

(21) Appl. No.: 10/445,493

(22) Filed: May 27, 2003

(65) Prior Publication Data
US 2004/0243709 A1    Dec. 2, 2004

(51) Int. Cl.
G06F 15/16    (2006.01)
(52) U.S. Cl. .................. 709/226; 709/224; 709/227
(58) Field of Classification Search ........ 709/200–203, 709/217–229, 238–242
See application file for complete search history.

(56) References Cited

U.S. PATENT DOCUMENTS

| | | | |
|---|---|---|---|
| 4,633,245 A | 12/1986 | Blount et al. | |
| 6,006,259 A | 12/1999 | Adelman et al. | |
| 6,173,374 B1 | 1/2001 | Heil et al. | |
| 6,185,601 B1 | 2/2001 | Wolff et al. | |
| 6,314,465 B1 | 11/2001 | Paul et al. | |
| 6,351,775 B1 | 2/2002 | Yu | |
| 6,463,454 B1 | 10/2002 | Lumelsky et al. | |
| 6,697,849 B1 | 2/2004 | Carlson | |
| 6,728,748 B1 * | 4/2004 | Mangipudi et al. | 718/105 |
| 6,779,017 B1 | 8/2004 | Lamberton et al. | |
| 6,850,982 B1 * | 2/2005 | Siegel | 709/227 |
| 6,874,031 B2 * | 3/2005 | Corbeil | 709/229 |
| 6,880,089 B1 | 4/2005 | Bommareddy et al. | |
| 6,886,035 B2 | 4/2005 | Wolff | |
| 7,003,574 B1 * | 2/2006 | Bahl | 709/228 |
| 2003/0014526 A1 * | 1/2003 | Pullara et al. | 709/227 |
| 2006/0080446 A1 * | 4/2006 | Bahl | 709/227 |

OTHER PUBLICATIONS

Mitzenmacher et al., "Load Balancing with Memory," The 43rd Annual IEEE Symposium on Foundations of Computer Science, Nov. 16-19, 2002, (1 page).

Gibbens et al., "Dynamic Routing in Multiparented Networks," IEEE/ACM Transactions on Networking, vol. 1. No. 2, Apr. 1993, (pp. 261-670).

* cited by examiner

*Primary Examiner*—Moustafa M. Meky
(74) *Attorney, Agent, or Firm*—Robert C. Kowert; Meyertons, Hood, Kivlin, Kowert & Goetzel, P.C.

(57) ABSTRACT

A system and method for cluster-sensitive sticky load balancing of server workload may include a load balancer receiving an initial request from a client. A session may be initiated in response to receiving the request. The load balancer may relay the initial request to a selected node, where the selected node may be part of a cluster of multiple nodes. Upon receiving a subsequent request pertaining to the session initiated by the initial request, the load balancer may determine if the selected node is active. If the selected node is active, the load balancer may relay the subsequent request to the selected node. If the selected node is not active, the load balancer may determine for which cluster the selected node was a member, and relay the subsequent request to another node in that same cluster.

31 Claims, 6 Drawing Sheets

Load balancer 150

Cluster mapping table 310

| Cluster 1: A, B, C, D |
| Cluster 2: E, F, G, H |
| Cluster 3: I, J, K, L |

Session mapping table 320

| Session 1: D |
| Session 2: G |
| Session 3: I |
| Session 4: A |
| Session 5: A |
| Session 6: E |
| Session 7: D |
| Session 8: K |
| Session 9: F |

SYSTEM AND METHOD FOR CLUSTER-SENSITIVE STICKY LOAD BALANCING

BACKGROUND OF THE INVENTION

1. Field of the Invention

This invention relates to the field of distributed computing systems and, more particularly, to load balancing and failover in clustered distributed computing systems.

2. Description of the Related Art

As workloads on modern computer systems become larger and more varied, more and more computational and data resources may be needed. For example, a request from a client to web site may involve a load balancer, a web server, a database, and an application server. Alternatively, some large-scale scientific computations may require multiple computational nodes operating in synchronization as a kind of parallel computer.

Any such collection of computational resources and/or data resources tied together by a data network may be referred to as a distributed system. Some distributed systems may be sets of identical nodes each at a single location connected together by a local area network. Alternatively, the nodes may be geographically scattered and connected by the Internet, or a heterogeneous mix of computers, each acting as a different resource. Each node may have a distinct operating system and be running a different set of applications.

Nodes in a distributed system may also be arranged as clusters of nodes, with each cluster working as a single system to handle requests. Alternatively, clusters of nodes in a distributed system may act semi-independently in handling a plurality of workload requests. In such an implementation, each cluster may have one or more shared data sources accessible to all nodes in the cluster.

Workload may be assigned to distributed system components via a load balancer (or hierarchy of load balancers), which relays requests to individual nodes or clusters. For some requests it may be desirable for a client-specific session history to be maintained by the distributed system. In such an application, a client and a node in the distributed system will typically interact several times, with a response from the node necessitating a subsequent request from a client, which in turn leads to another response from the node, and so on. For example, e-commerce may require that a server be aware of what financial information the client has already provided. This history may be tracked by providing information such as a session tracking number or session identifier (ID) to the client, often in the form of a cookie. This information is returned to the distributed system along with all future transaction requests from the client that are part of the session, so that the distributed system may use the session tracking number to look up previous transaction history and manage multiple concurrent client session histories.

One difficulty involved with managing session histories is that different nodes in different clusters may not have access to the same data sources, and thus, the same session histories. Alternatively, accessing data in other clusters or nodes may incur excess synchronization overhead or take much longer than accessing data local to a cluster or node. Because of this, load balancers may execute "sticky" load balancing, wherein a client request continuing a given session is sent to the same node that originated the session. Sticky load balancing generally involves a load balancer tracking the node currently handling a given session, often through a node identification number or node address associated with the session ID and/or bundled with the client requests.

A further difficulty with sticky load balancing may occur when the node handling a client session fails. The load balancer may send client requests for that session to another node in the system that does not have access to the client session history. This may lead to a timeout or communication error, since the new server would be unable to access the client's session history, which may in turn require a failure or restart of the session.

SUMMARY

A system and method for cluster-sensitive sticky load balancing of server workload is disclosed. The method may include a load balancer receiving an initial request from a client. A session may be initiated and the load balancer may relay the initial request to a selected node, where the selected node may be part of a cluster of multiple nodes. Each node in the cluster may share one or more common data sources, and multiple clusters of multiple nodes may embody a distributed system. Upon receiving a subsequent request relating to the session initiated by the initial request, the load balancer may determine if the selected node is active. If the selected node is active, the load balancer may relay the subsequent request to the initial node. If the selected node is not active, the load balancer may determine which nodes are part of the same cluster as the selected node, and relay the subsequent request to another node in that same cluster.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Figure 1:
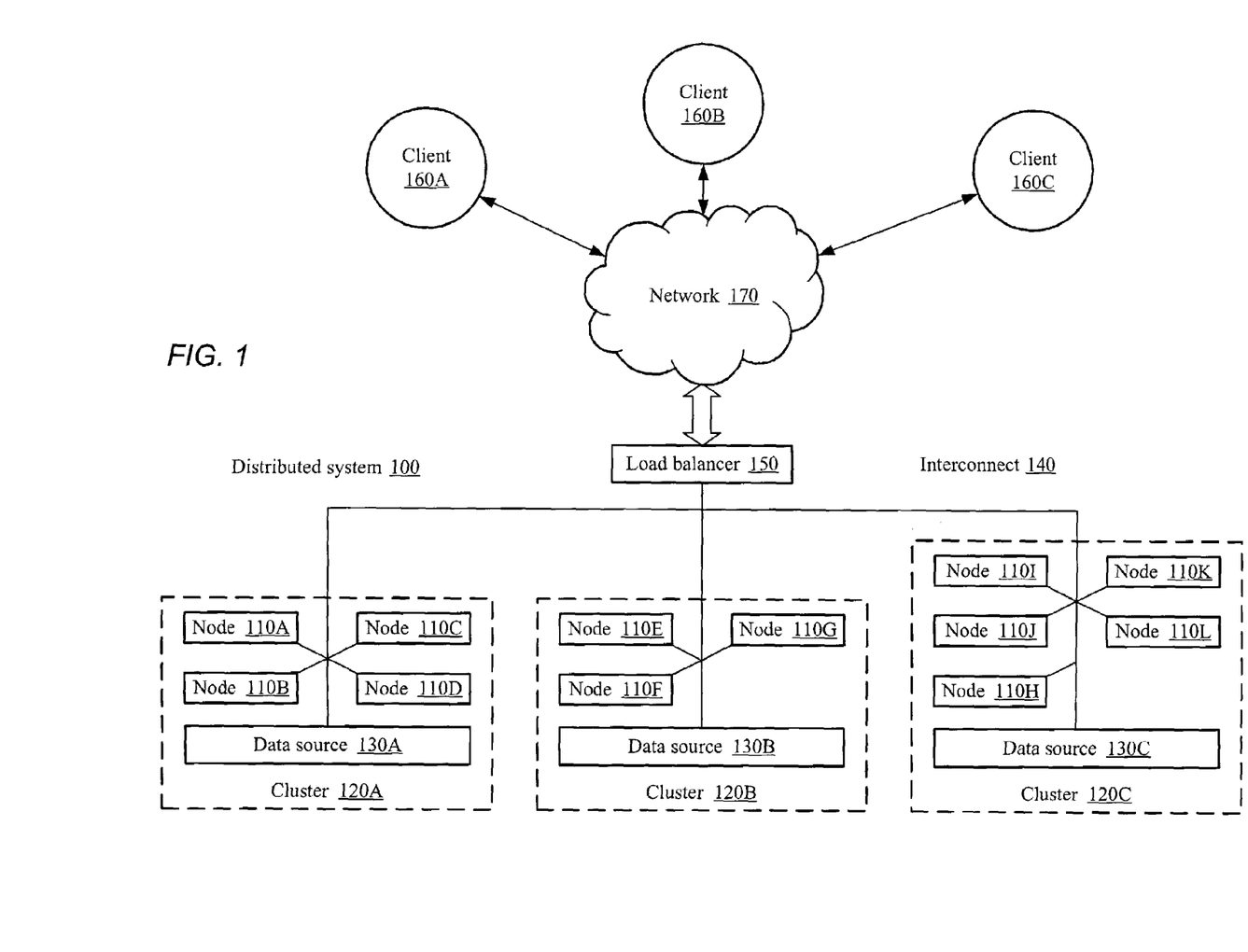
FIG. 1 is a block diagram of a distributed system, according to one embodiment.

Turning now to FIG. 1, a block diagram of a distributed system 100 is shown. Distributed system 100 includes multiple nodes 110A–L, arranged in clusters 120A–C. Clusters 120A–C are coupled via interconnect 140 to load balancer 150, which is in turn connected to clients 160A–C via network 170.

Each cluster 120A–C may be operable to handle a plurality of requests from clients 160A–C for a variety of functions. Such functions may include, but are not limited to, acting as a database, web server, directory server, application server, or e-commerce server.

Load balancer 150 is operable to receive requests from clients 160A–C via network 170 and send these requests to clusters 120A–C in a balanced fashion so that no single cluster 120A–C is overwhelmed with or starved of requests. This process is known as "load balancing" the requests. Requests may be load balanced between clusters 120A–C by a round-robin scheme, a priority-based scheme, a load-tracking scheme, a combination thereof, or any other type of applicable scheme. Load balancer 150 is also operable to execute a method for "sticky" load balancing, as will be described in further detail below.

Both interconnect 140 and network 170 may be a point-to-point fabric, a local area network (LAN), a wide area network (WAN), the Internet, any other type of computing interconnect, or a combination thereof.

Each cluster 120A–C includes data source 130A–C, which is connected to the cluster by interconnect 140. All nodes within each cluster may access the same data from the data source 130A–C associated with that particular cluster. It is noted that in one embodiment, nodes in clusters 120A–C may access data sources 130A–C on a non-local cluster. For example, node 110A may access data source 130C. However, such a remote access may take significantly longer than a local access (e.g. node 110A accessing data source 130A).

It is noted that many of the details in FIG. 1 are purely illustrative, and that other embodiments are possible. For example, load balancer 150 is pictured as a single system separate from clusters 120A–C. However, load balancer 150 may instead be a software process running on a node 110A–L in distributed system 100.

Furthermore, data sources 130A–C may include databases separate from any of the nodes in clusters 120A–C and include various types of storage, such as RAID arrays. Alternatively, data sources 130A–C may be one or more data sources located on one or more nodes 110A–L within clusters 120A–C. Likewise, the number of nodes and clusters in FIG. 1 should be considered purely illustrative. It is noted that a distributed system may contain any plurality of clusters and nodes.

Figure 2:
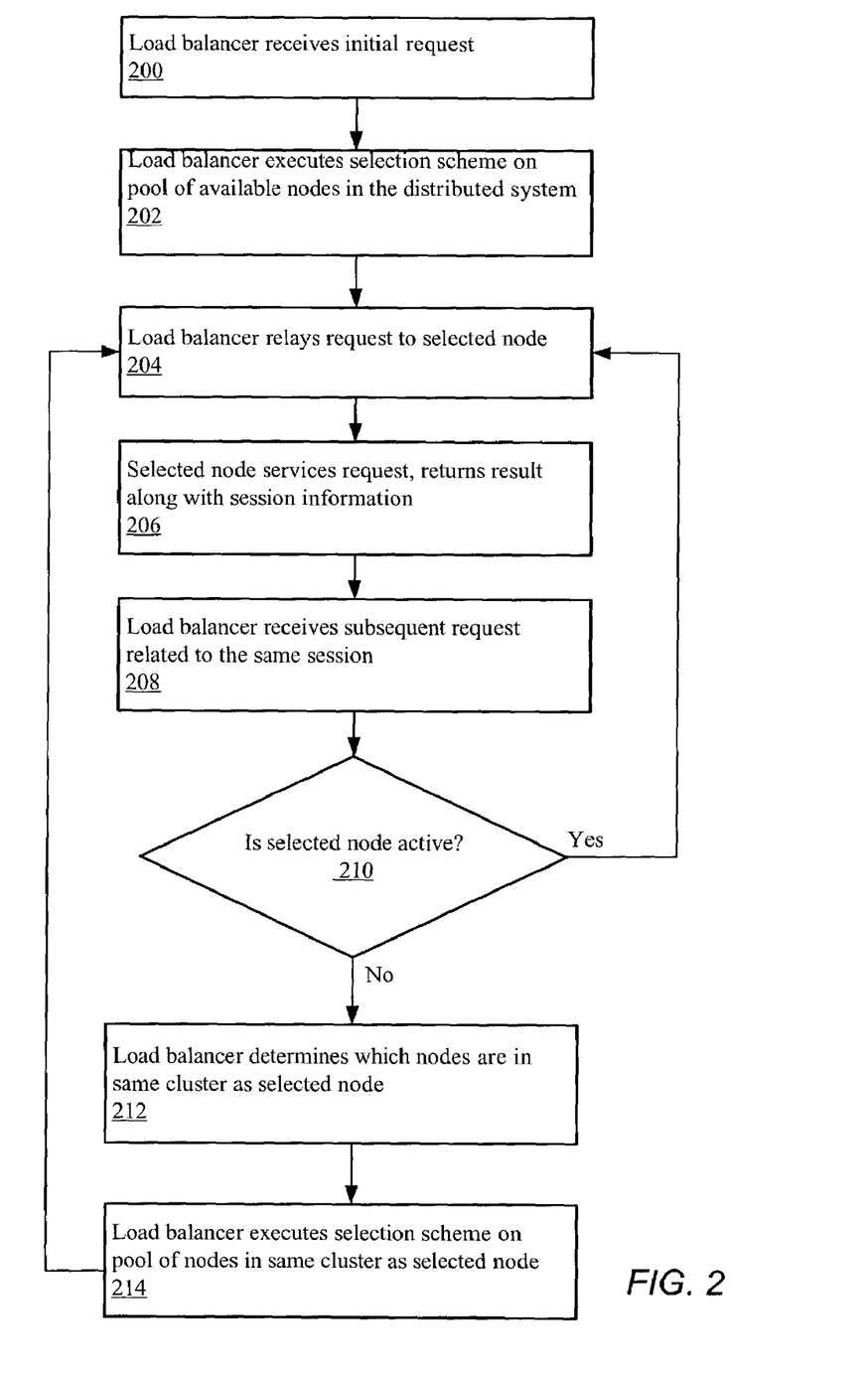
FIG. 2 is a flow diagram illustrating one embodiment of a method for cluster-sensitive sticky load balancing.

FIG. 2 is a flow diagram illustrating a method for cluster-sensitive sticky load balancing. Referring collectively now to FIGS. 1–2, in 200 load balancer 150 receives an initial request from a client 160A–C. In 202 load balancer 150 executes a selection scheme on the pool of available nodes 110A–L in distributed system 100. This selection scheme may be a round-robin scheme, a priority-based scheme, a method based on current workload, any other load balancing scheme, or a combination of these methods.

Once a node 100A–L has been selected from distributed system 100, load balancer 150 relays the request to the selected node in 204. In 206 the selected node services the request and returns the result back to client 160A–C, along with some type of session information. This session information may be in the form of a cookie, for example. The session information may include information to track a session history, such as a session identification number, a node identification number and/or a node's network address, for example.

In 208 load balancer 150 receives a subsequent request from the same client 160A–C that sent the original request, pertaining to the session started in 200. The load balancer 150 may determine that the request pertains to an existing session through a session identification number sent along with the request by client 160A–C. This session identification number may then be compared to a session mapping table maintained by load balancer 150 to determine which node 110A–L is the selected node that serviced the original request, as will be discussed further below. Alternatively, client 160A–C may send an identification number or network address associated with the selected node to indicate which node handled the original request.

In 210 load balancer 150 determines if the selected node is active, and thus able to service the subsequent request. Load balancer 150 may determine the selected node's status through means of a heartbeat tracking method, wherein the load balancer periodically sends out messages to determine which nodes are active.

Alternatively, load balancer 150 may determine which nodes are active by tracking node response to various requests. For example, if a node 110A–L has failed to respond to any requests in a given time period, load balancer 150 may mark that node 110A–L as unavailable to service future requests. In other embodiments, other techniques may be used to determine the selected node's status, such as using dummy requests, etc.

If the selected node is determined to be available in step 210, load balancer 150 returns to 204, wherein the subsequent request is forwarded to the selected. The method may then continue through the loop of instructions between 204 and 210 multiple times until the session is ended, as load balancer 150 continually determines that the selected node is able to handle a new subsequent request for the session and forwards the new subsequent request on to the selected node.

If the selected node is determined to be unavailable in 210, load balancer 150 determines which other nodes 110A–L are part of the same cluster 120A–C as the selected node, as indicated at 212. In one embodiment load balancer 150 may examine a cluster mapping table to determine which nodes 110A–L are grouped into which clusters 120A–C, as will be discussed further below. Alternatively, other methods may be used to determine cluster membership In 214 load balancer 150 once more executes a selection scheme on the pool of available nodes 110A–L in distributed system 100, as previously described in step 202, this time limiting the selection scheme to only those nodes 110A–L in the same cluster 120A–C as the initially selected node. The method then returns to 204, where load balancer 150 relays the subsequent request to the newly selected node, which may service the subsequent request using the data source 130A–C to access any relevant session history.

Figure 3:
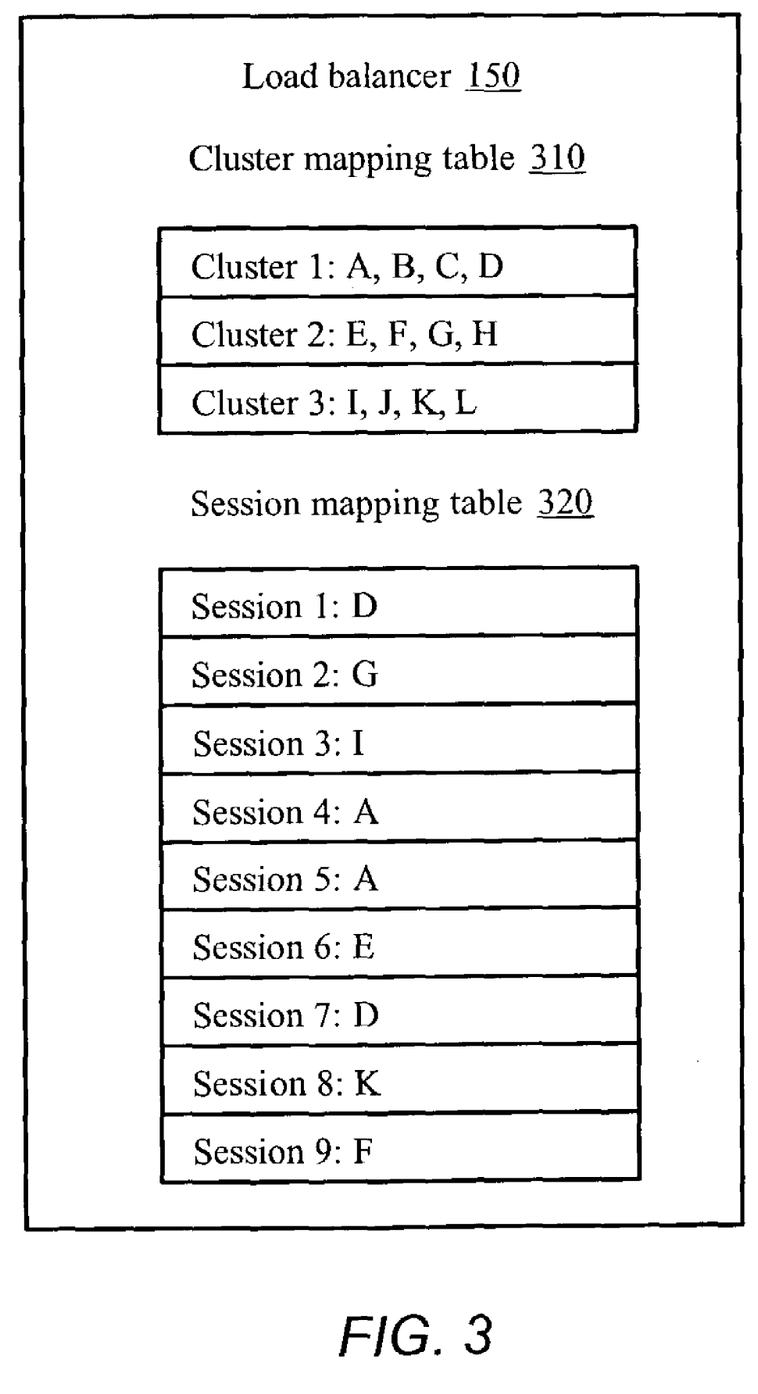
FIG. 3 illustrates a cluster mapping table and session mapping table, according to one embodiment.

Turning now to FIG. 3, cluster mapping table 310 and session mapping table 320 are illustrated. In the illustrated embodiment, both tables are local to load balancer 150. Cluster mapping table 310, which represents distributed system 100 as illustrated in FIG. 1, includes three entries, one per cluster 120A–C, each of which identifies the nodes 110A–L comprising that cluster. Session mapping table 320 comprises nine entries in this example, one for each active session being handled by distributed system 100. Each entry lists the specific node 110A–L handling the given session.

It is further contemplated that, in addition to listing the specific node 110A–L handling each session, each entry in session mapping table 320 may additionally contain an indication of the cluster 120A–C associated with that node. For example, entry 1 in table 320 lists node D as handling session 1. In another embodiment, entry 1 would also list cluster A as the cluster associated with the session, to better facilitate the mechanism for cluster lookup. It is also noted that the number of clusters, sessions, and entries is purely illustrative, and that both cluster mapping table 310 and session mapping table 320 may include any number of relevant entries.

Figure 4:
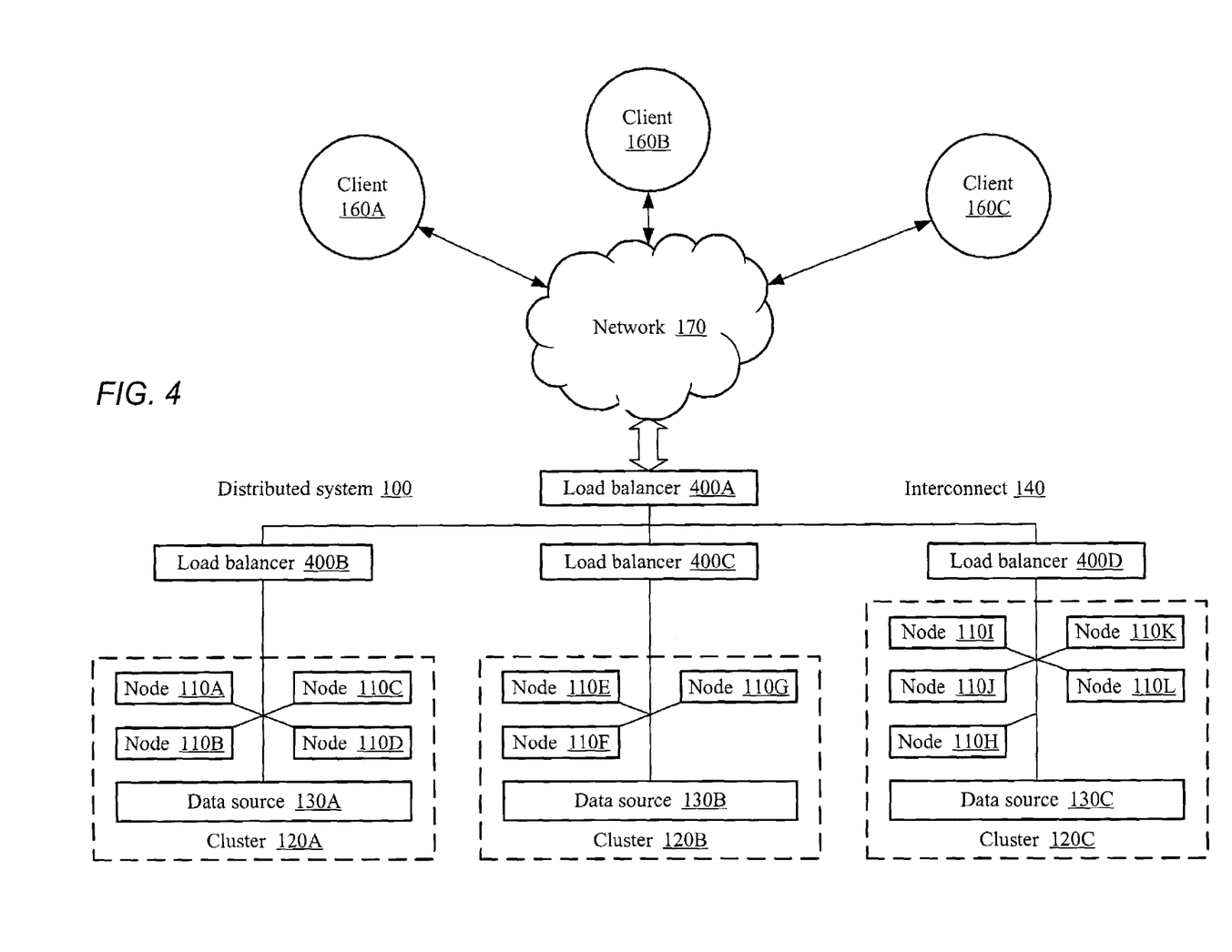
FIG. 4 illustrates an embodiment of a distributed system, including a hierarchical load balancer.

Turning now to FIG. 4, an alternate embodiment of load balancer 150 from FIG. 1 is shown. Here, load balancer 150 is replaced by a hierarchy of load balancer nodes 400A–D. As before, the load balancing mechanism is coupled to clients 160A–C and clusters 120A–C through network 170 and interconnect 150, respectively.

In the illustrated embodiment, load balancer 400A receives requests from clients 160A–C via network 170 as described above in FIG. 1. However, rather than relaying requests directly to clusters 120A–C, load balancer 400A may load balance each request to one of load balancers 400B–D, each of which is responsible for further distributing requests to an associated cluster 120A–C. It is noted that the number of load balancers 400A–D and levels in the hierarchy of load balancers may differ from what is illustrated in FIG. 4.

As described in FIG. 2 above, load balancers 400A–D execute a method for cluster-sensitive sticky load balancing. An initial request from a client 160 A–C may be propagated down to a selected node 110A–H for servicing. As additional requests pertaining to a session initiated by the initial request are sent through load balancers 400A–D, these additional requests are sent to the selected node 110A–H if the selected node is active. If the selected node is inactive, a lower-level load balancer 400B–D may assign the additional requests to another node in the same cluster 120A–C as the selected node.

Referring to FIGS. 1–4, it is further noted that, in the embodiment illustrated in FIG. 4, the method described in FIG. 2 may not require cluster mapping table 310 for lower-level load balancers 400 B–D. Because each load balancer 400B–D relays requests only to one cluster 120A–C, any node 110A–L accessible by load balancer 400B–D will be part of the same cluster 120A–C as the initially selected node. Thus, any newly selected node 110A–L may have access to the same data source 130A–C, and may thus be able to continue the session history.

Figure 5:
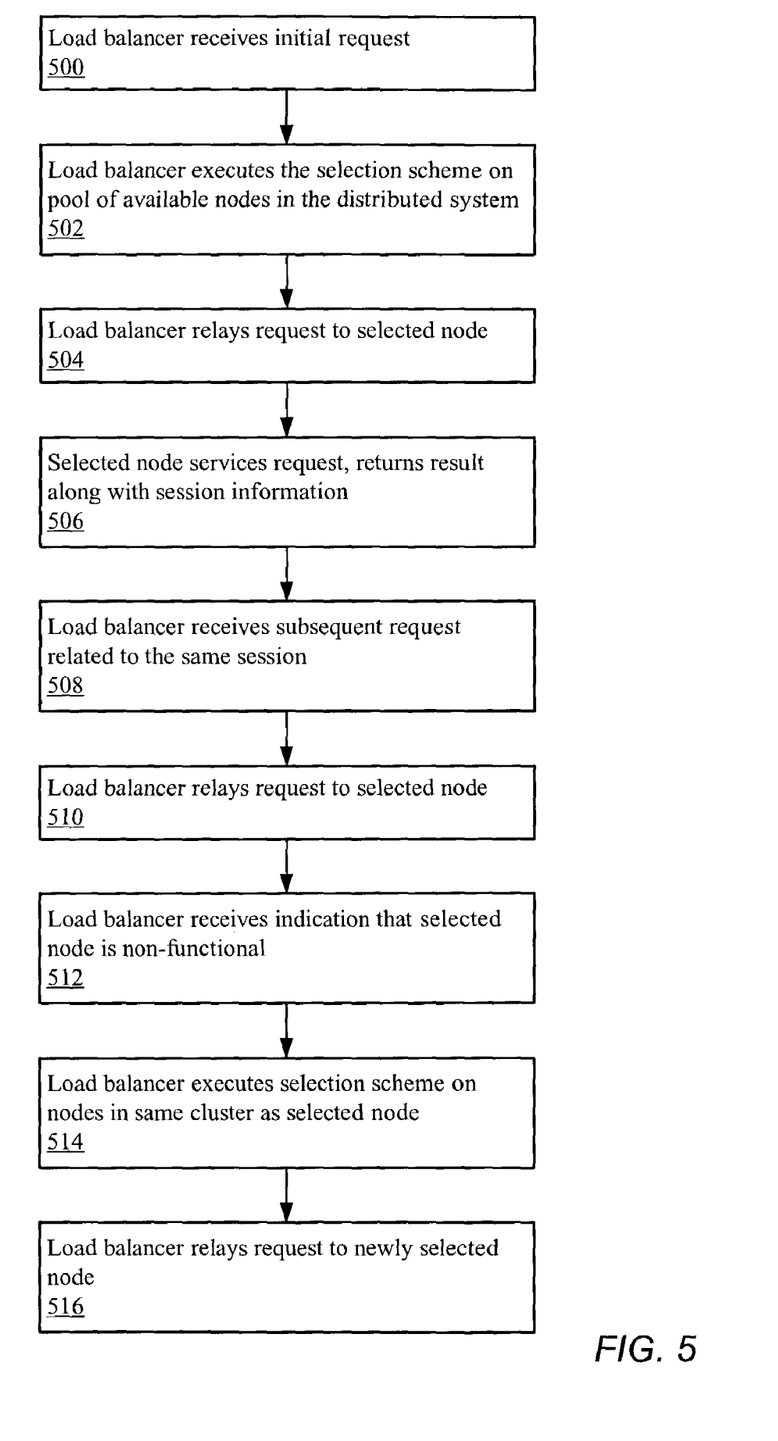
FIG. 5 is a flow diagram illustrating an embodiment of a method for cluster-sensitive sticky load balancing.

FIG. 5 is a flow diagram illustrating an alternate embodiment a method for cluster-sensitive sticky load balancing. Referring collectively now to FIGS. 2 and 5, in 500 load balancer 150 receives a request from clients 160A–C via network 170. In 502, load balancer 150 executes a selection scheme on the pool of available nodes 1110A–L in distributed system 100.

In 504, load balancer 150 relays the request to the selected node, which services and returns the request, along with session information, in 506. In 508, load balancer 150 receives a subsequent request related to the same session as the first request from client 160A–C. Using the session information accompanying the subsequent request, load balancer 150 relays the subsequent request to the selected node in 510.

In 512, load balancer 150 receives an indication that the selected node may be non-functional. This indication may be in the form of a signal from a monitoring process that monitors the status of all nodes 110A–L in distributed system 100. Alternatively, a user may indicate that the selected node is non-functional, or the selected node itself may determine that it is unable to service a request.

In response to receiving an indication that the selected node is non-functional, load balancer 150 executes a selection scheme on all remaining nodes 110A–L in the same cluster 120A–C as the selected node. In 516, load balancer 150 relays the request to the newly selected node. In one embodiment, load balancer 150 may store a temporary copy of the request in order to forward the request to the newly selected node in response to an indication of a non-functional node 110A–L. Alternatively, in another embodiment, load balancer 150 may signal client 160A–C to resend the request in response to an indication of a non-functional node 110A–L.

It is thus noted that load balancer 150 may take a more active role in sticky load balancing at the time of failover. It is additionally noted that, in one embodiment, load balancer 150 may modify cluster mapping table 310 and session mapping table 320 upon detection or notification that a selected node is non-functional, thereby removing any current sessions from the failed node, and preventing any other sessions from being started on the failed node until the node is repaired.

For example, load balancer 150 may receive notification that node 110K in cluster 120C is non-functional. In response, load balancer 150 may search through session mapping table 320 for all sessions associated with node 110K, and reassign those sessions to other nodes in cluster 120C. It is noted that since all nodes in cluster 120C share a common data source 130C, any node in cluster 120C should be able to continue sessions started by node 110K, thus providing a unified system image of the cluster to any clients. In addition, load balancer 150 may modify cluster mapping table 310 to indicate that no further sessions should be moved to node 110K until it is repaired.

Figure 6:
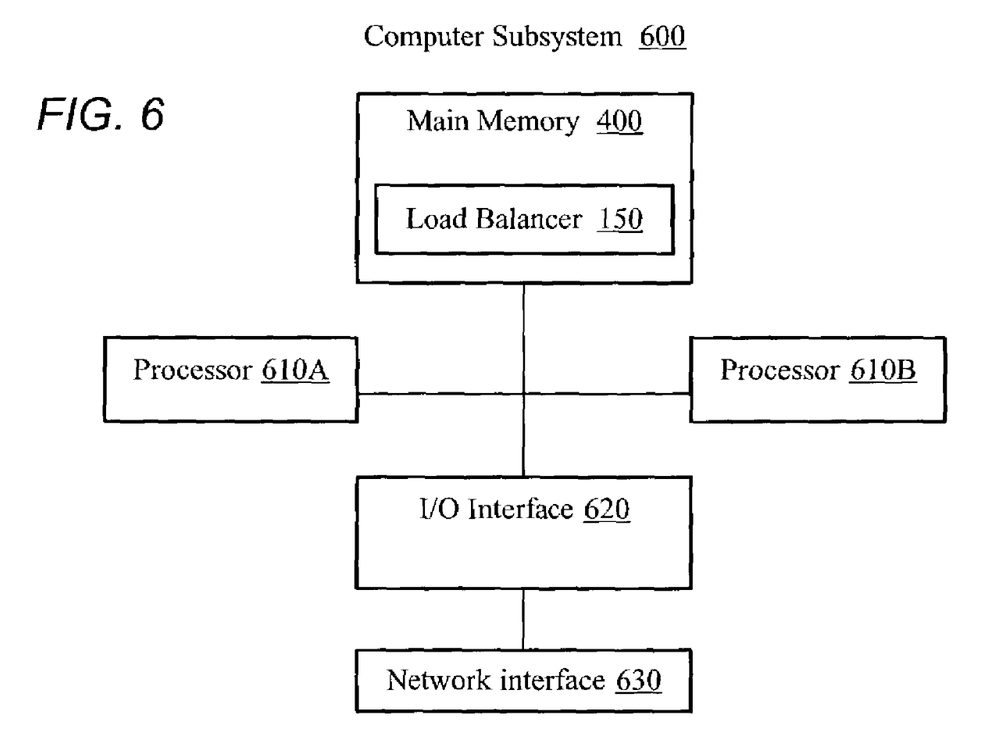
FIG. 6 illustrates an exemplary computer subsystem for implementing certain embodiments.

Turning now to FIG. 6, an exemplary computer subsystem 600 is shown. Computer subsystem 600 includes main memory 620, which is coupled to multiple processors 610A–B, and I/O interface 630. It is noted that the number of processors is purely illustrative, and that one or more processors may be resident on the node. I/O interface 630 further connects to network interface 640. Such a system is exemplary of a load balancer, a node in a cluster or any other kind of computing node in a distributed system.

Processors 610A–B may be representative of any of various types of processors such as an x86 processor, a PowerPC processor or a CPU from the SPARC family of RISC processors. Likewise, main memory 620 may be representative of any of various types of memory, including DRAM, SRAM, EDO RAM, Rambus RAM, etc., or a non-volatile memory such as a magnetic media, e.g., a hard drive, or optical storage. It is noted that in other embodiments, main memory 600 may include other types of suitable memory as well, or combinations of the memories mentioned above.

Processors 610A–B of computer subsystem 600 may execute software configured to execute a method of sticky load balancing for clusters in a distributed system, as described in detail above in conjunction with FIGS. 1–5. The software may be stored in memory 620 of computer subsystem 600 in the form of instructions and/or data that implement the operations described above.

For example, FIG. 6 illustrates an exemplary load balancer 150 stored in main memory 620. The instructions and/or data that comprise central controller 130 and any components contained therein may be executed on one or more of processors 610A–B, thereby implementing the various functionalities of load balancer 150 described above.

In addition, other components not pictured such as a display, keyboard, mouse, or trackball, for example may be added to node 110. These additions would make node 110 exemplary of a wide variety of computer systems, such as a laptop, desktop, or workstation, any of which could be used in place of node 110.

Various embodiments may further include receiving, sending or storing instructions and/or data that implement the operations described above in conjunction with FIGS. 1–5 upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
    receiving an initial request from a client, wherein the initial request initiates a session;
    relaying the initial request to a selected node, wherein the selected node is part of a cluster of multiple nodes, and wherein the cluster is one of a plurality of clusters in a distributed system;
    receiving a subsequent request, wherein the subsequent request pertains to the same session;
    determining if the selected node is active;
    if the selected node is active, relaying the subsequent request to the selected node; and
    if the selected node is not active:
        determining the identity of the selected node's cluster wherein said determining the identity of selected node's cluster comprises examining a cluster mapping table, wherein the cluster mapping table indicates which nodes are associated with which clusters; and
        relaying the subsequent request to another node in the same cluster as the selected node.

2. The method of claim 1, further comprising maintaining a session mapping table for each cluster, wherein each session mapping table indicates which nodes of its respective cluster in the distributed system are associated with which sessions.

3. The method of claim 1, wherein said determining if the selected node is active comprises employing a heartbeat method.

4. The method of claim 1, wherein said determining if the selected node is active comprises tracking the selected node's response to a previous request.

5. The method of claim 1, further comprising determining if a request pertains to an existing session through the use of session information provided with the request.

6. The method of claim 5, wherein the session information comprises a session identification number.

7. The method of claim 5, wherein said relaying the subsequent request to the selected node comprises using the session information to identify the selected node.

8. The method of claim 7, wherein the session information comprises the selected node's identification number or the selected node's network address.

9. The method of claim 5, wherein the session information is provided to the client in the form of a cookie in response to the initial request.

10. The method of claim 1, wherein the selected node is initially selected by a round-robin selection scheme, a priority-based selection scheme, a load-tracking selection scheme, or a combination thereof.

11. A distributed system, comprising:
    a plurality of clusters, wherein each cluster comprises a plurality of nodes and a data source particular to that cluster configured to store session information for the plurality of nodes in that cluster;
    a load balancer, operable to relay requests to individual clusters or nodes, wherein the load balancer is configured to:
        receive an initial request from a client, wherein the initial request initiates a session;
        relay the initial request to a selected node;
        receive a subsequent request, wherein the subsequent request pertains to the same session;
        determine if the selected node is active;
        relay the subsequent request to the selected node if the selected node is active; and
        determine the identity of selected node's cluster and relay the subsequent request to another node in the same cluster as the selected node if the selected node is not active, wherein the other node is configured to retrieve session information associated with the session from the particular data source of the selected node's cluster.

12. The distributed system of claim 11, wherein the load balancer is configured to access a session mapping table, wherein the session mapping table indicates which nodes in the distributed system are associated with which sessions.

13. The distributed system of claim 11 wherein the load balancer is further operable to examine a cluster mapping table to determine which nodes are associated with which clusters.

14. The distributed system of claim 11 wherein the load balancer is configured to employ a heartbeat method to determine if the selected node is active.

15. The distributed system of claim 11 wherein the load balancer is configured to track the selected node's response to a previous request to determine if the selected node is active.

16. The distributed system of claim 11 wherein the load balancer is configured to determine if a request pertains to an existing session through the use of session information provided with the request.

17. The distributed system of claim 16, wherein the session information comprises a session identification number.

18. The distributed system of claim 16 wherein the load balancer is configured to relay the subsequent request to the selected node comprises using the session information to identify the selected node.

19. The distributed system of claim 18, wherein the session information comprises the selected node's identification number or the initial node's network address.

20. The method of claim 16, wherein the session information is given to the client in the form of a cookie.

21. The method of claim 11 wherein the load balancer is configured to initially select the selected node by a round-robin selection scheme, a priority-based selection scheme, a load-tracking selection scheme, or a combination thereof.

22. A computer accessible medium comprising program instructions executable to implement:
    receiving an initial request from a client, wherein the initial request initiates a session;

relaying the initial request to a selected node, wherein the selected node is part of a cluster of multiple nodes, and wherein the cluster is one of a plurality of clusters in a distributed system;

receiving a subsequent request, wherein the subsequent request pertains to the same session;

determining if the selected node is active;

if the selected node is active, relaying the subsequent request to the selected node; and if the selected node is not active:
  determining the identity of selected node's cluster wherein said determining the identity of selected node's cluster comprises examining a cluster mapping table, wherein the cluster mapping table indicates which nodes are associated with which clusters; and
  relaying the subsequent request to another node in the same cluster as the selected node.

23. The computer accessible medium of claim 22, wherein the program instructions are further executable to implement maintaining a session mapping table for each cluster, wherein each session mapping table indicates which nodes of its respective cluster in the distributed system are associated with which sessions.

24. The computer accessible medium of claim 22, wherein said determining if the selected node is active comprises employing a heartbeat method.

25. The computer accessible medium of claim 22, wherein said determining if the selected node is active comprises tracking the selected node's response to a previous request.

26. The computer accessible medium of claim 22, wherein the program instructions are further executable to implement determining if a request pertains to an existing session through the use of session information provided with the request.

27. The computer accessible medium of claim 26, wherein the session information comprises a session identification number.

28. The computer accessible medium of claim 26, wherein said relaying the subsequent request to the selected node comprises using the session information to identify the selected node.

29. The computer accessible medium of claim 28, wherein the session information comprises the selected node's identification number or the selected node's network address.

30. The computer accessible medium of claim 26, wherein the session information is provided to the client in the form of a cookie in response to the initial request.

31. The computer accessible medium of claim 22, wherein the selected node is initially selected by a round-robin selection scheme, a priority-based selection scheme, a load-tracking selection scheme, or a combination thereof.

* * * * *